Oct. 14, 1941.   J. R. MORGAN   2,259,077
LID KNOB
Filed June 15, 1939
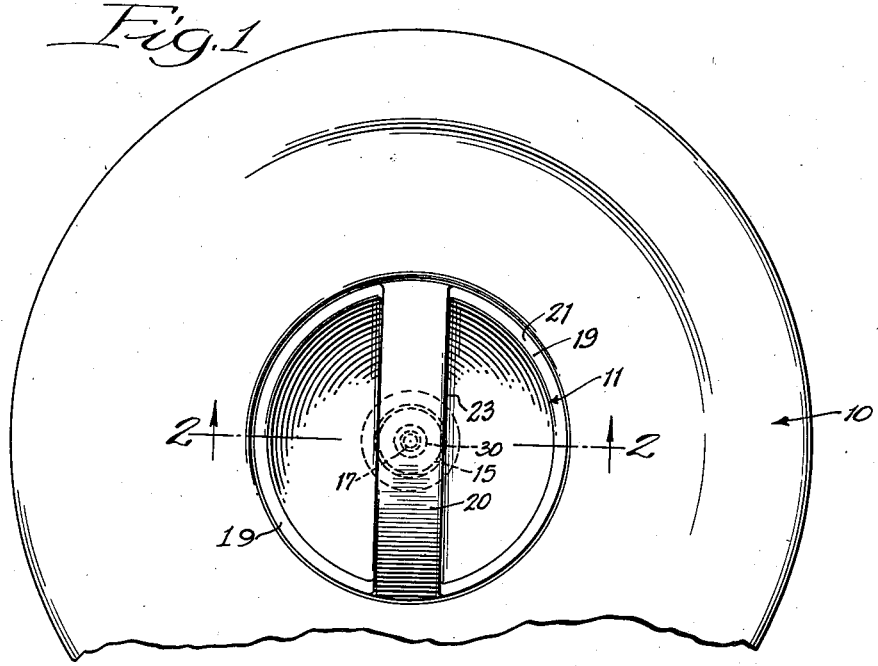
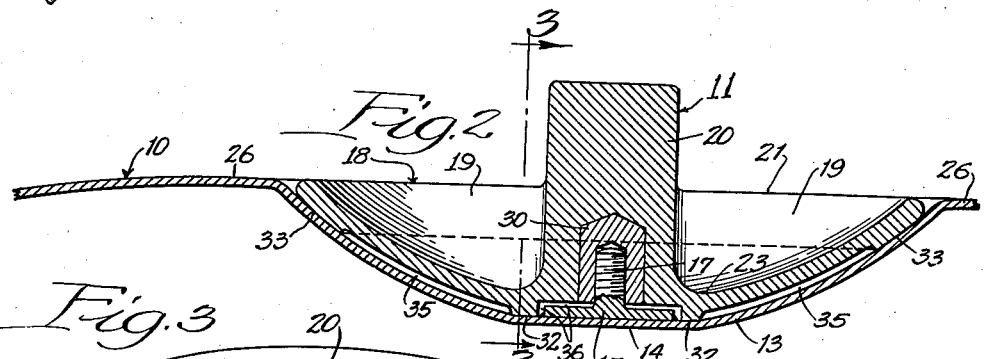
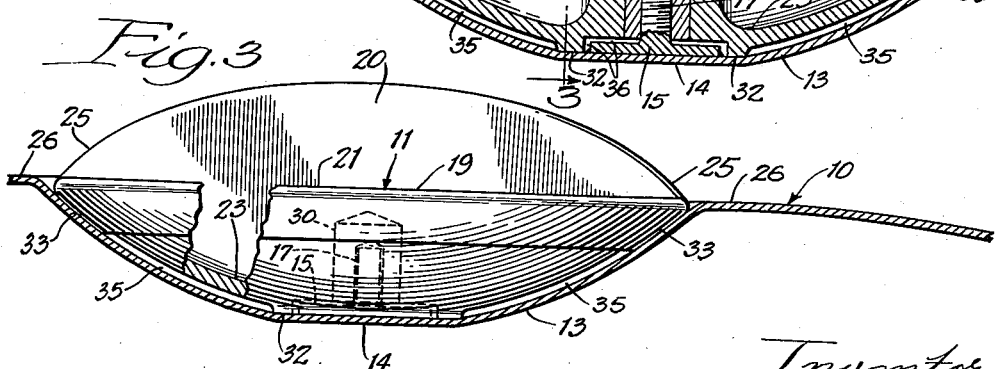
Inventor:
John R. Morgan,
By Frank H. Marks,
Attorney.

Patented Oct. 14, 1941

2,259,077

UNITED STATES PATENT OFFICE 2,259,077

LID KNOB

John R. Morgan, Oak Park, Ill., assignor to Sears, Roebuck and Co., Chicago, Ill., a corporation of New York Application June 15, 1939, Serial No. 279,275

3 Claims. (Cl. 16—121)

This invention pertains to handles or knobs and is concerned more particularly with, although not limited to, lids for pots such as coffee pots, pans and the like.

It is an object of my invention to provide a knob mounted in such a manner as to be readily grasped by the thumb and one or more fingers without subjecting them to the heat of the part on which the knob is mounted.

It is another object to provide a knob which, when mounted in place, does not project from the lid or the like support sufficiently to catch on the clothing.

A further object is to provide a knob of the character referred to so mounted that it is readily grasped to move the member on which the knob is mounted and at the same time protect from excessive heat the hand grasping the knob and minimize likelihood of catching the clothing on the knob.

Further objects and advantages of the invention will appear as the description proceeds.

The invention will be better understood upon reference to the following description and the accompanying drawing, in which:

Fig. 1 is a fragmentary plan view of a lid or other support provided with a knob constructed in accordance with one form of the invention.

Fig. 2 is an enlarged fragmentary sectional view taken substantially as indicated by the line 2—2 in Fig. 1.

Fig. 3 is a side view, partly in section and partly in elevation, taken as indicated by the line 3—3 in Fig. 2, part of the knob support being omitted.

Referring now more particularly to the drawing, there is shown a support 10 such as a lid for a coffee pot, pan or other article, and to the lid is secured a knob 11 constructed in accordance with one form of the invention. The lid 10 is formed with a depression 13 which may be disposed centrally or elsewhere thereon and may be spherical as shown or in any other desired shape. Preferably at the base 14 of the depression, there is welded or otherwise suitably secured an anchor stud 15 having a preferably threaded shank 17 extending away from the bottom 14. The knob 11 preferably lines the depression and has a skirt 18 comprising spaced skirt-like sections 19 and an intervening preferably diametral handle 20 which may project outwardly beyond the mouth or rim 21 of the skirt. The height of the handle 20 from the base 23 is sufficiently great to enable said handle to be conveniently and firmly grasped by a person's thumb and finger or fingers so that the lid or other member on which the handle is secured may be easily manipulated. The portion of the handle 20 projecting outwardly may be of any suitable shape, but preferably it is rounded as shown particularly in Fig. 3 to substantially merge as at 25 with the adjacent top surface 26 of the lid or other support 10, so as to preclude catching of clothing on the lid. Such danger exists in prior lid constructions.

A nut 30 is secured in the knob and is threaded to receive the anchoring shank 17, and is readily threaded on the latter and adapted to be securely retained in the depression 13 by virtue of the frictional engagement between the knob and said depression. This frictional engagement is made possible by the provision of depending preferably annular ribs 32 and 33 on the knob. These ribs are separated by a preferably relatively large air space 35, and the rib 32 is formed to clear the stud 15, as at 36. The ribs 32 and 33 are of such curvature that they firmly and frictionally engage the depression 13 at the same time when the knob is threaded home. The pitch of the threads is preferably low and the cooperating parts, while stiff, may yield resiliently sufficiently to enhance the holding power of the ribs in the depression. The handle portion 20 is preferably relatively flat not only for convenience in grasping but for convenience in rotating the knob into place, and its sides may be roughened to improve the grip.

The knob being detachable, it is apparent that it may be readily replaced.

The lid 10 or the like is usually made of metal because of its desirable heat conducting qualities, but the knob is preferably molded of a heat insulating material of a phenolic condensation or resinous product or other suitable material. The areas 32 and 33 are merely sufficiently great to provide the proper hold or lock for the knob, the spaces 35 and 36 accordingly being as great as possible so as to minimize heat conduction. Accordingly, a lid carrying a knob constructed in accordance with my invention will remain at approximately room temperature notwithstanding the relatively high temperature of the lid.

It is obvious that I have provided a construction which is not only desirable from an appearance standpoint but is easily manufactured at low cost, may be readily secured and replaced, is durable, enables the lid to be moved about with comfort notwithstanding the high temperature of the lid, minimizes catching of clothing and the like and is generally suitable for the purposes for which the same is intended.

Various modifications may suggest themselves to those skilled in the art without departing from the spirit of my invention, and, hence, I do not wish to be restricted to the specific form shown or uses mentioned, except to the extent indicated in the appended claims, which are to be interpreted as broadly as the state of the art will permit.

I claim:

1. In a support having a depression, a knob of heat insulating material formed for securement to said depression, said knob having a skirt shaped in general conformity with said depression, said skirt having spaced apart portions engageable with said depression, the intervening space affording heat insulation between said skirt and said depression, said knob having a handle portion projecting from said skirt sufficiently to enable said handle to be firmly grasped between the thumb and finger, said skirt terminating substantially at the rim of said depression when said knob is secured in said depression.

2. In a support having a depression, a knob of heat insulating material secured to said support and having a skirt shaped in general conformity with said depression, said skirt having spaced apart portions engageable with said depression, the intervening space affording heat insulation between said skirt and said depression, said knob having a diametral handle portion connected substantially throughout its length to said skirt and projecting sufficiently to enable said handle to be firmly grasped between the thumb and forefinger, said handle projecting outwardly of said depression and being of slightly rounded contour substantially merging at its ends with the adjacent surface of said support at said rim.

3. In a support having a depression, a knob of heat insulating material formed for securement to said depression, said knob having a skirt shaped in general conformity with said depression, said skirt having an inner portion spaced from said depression, said space affording heat insulation between said skirt and said depression, said skirt outwardly of said space substantially continuously engaging said depression so as to substantially prevent escape of hot air from said space, said knob having a handle portion projecting from said skirt sufficiently to enable said handle to be firmly grasped between the thumb and forefinger, said skirt effectively shielding the thumb and forefinger from heat from the portion of said support disposed below said thumb and forefinger when said knob is secured in said depression.

JOHN R. MORGAN.